United States Patent [19]

Quick et al.

[11] 4,198,803
[45] Apr. 22, 1980

[54] CUTTERBAR FOR A CROP HARVESTING MACHINE

[75] Inventors: Graeme R. Quick, Lilydale, Australia; William M. Mills, Brantford, Canada

[73] Assignee: White Motor Corporation of Canada Limited, Brantford, Canada

[21] Appl. No.: 805,738

[22] Filed: Jun. 13, 1977

[30] Foreign Application Priority Data

Aug. 13, 1976 [CA] Canada .................................. 259086

[51] Int. Cl.$^2$ .......................................... A01D 55/02
[52] U.S. Cl. ................................................... 56/296
[58] Field of Search .............................. 56/296–311, 56/14.5, 14.6, 257, 264

[56] References Cited

U.S. PATENT DOCUMENTS

| 283,292 | 8/1883 | Snyder | 56/298 |
|---|---|---|---|
| 1,165,169 | 12/1915 | Hawkins | 56/296 |
| 2,599,438 | 6/1952 | Downing et al. | 56/158 |
| 2,619,787 | 12/1952 | Mills et al. | 56/310 |
| 2,680,340 | 6/1954 | Pazandak | 56/17.6 |
| 2,994,176 | 8/1961 | Stroburg et al. | 56/298 |
| 3,098,338 | 7/1963 | Myers | 56/296 |
| 3,151,434 | 10/1964 | Hamel | 56/296 |
| 3,760,571 | 9/1973 | Foster | 56/298 |
| 3,848,401 | 11/1974 | Hast | 56/296 |
| 3,866,400 | 2/1975 | May | 56/158 |

FOREIGN PATENT DOCUMENTS

| 2026681 | 12/1971 | Fed. Rep. of Germany | 56/14.5 |
|---|---|---|---|
| 209890 | 5/1966 | Sweden | 56/300 |

*Primary Examiner*—Russell R. Kinsey
*Attorney, Agent, or Firm*—Lockwood, Dewey, Alex & Cummings

[57] ABSTRACT

A cutterbar for a crop harvesting machine having narrow pitch guard prongs and knife points. The guard prongs are formed on guard sections, and the knife points are formed on knife sections, wherein the guard sections include a plurality of prongs and the knife sections include a plurality of points and symmetrically arranged mounting holes allow mounting the guard sections on a conventional bar back. The knife sections include form-beveled and serrated knife edges, together with fastener assemblies for connecting the knife sections to the knife back such as to permit easy replacement of damaged knife sections. A drive assembly for the knife bar applies reciprocating action to the knife bar. Feeder shields protect the drive assembly and enhance the feed of crop to the collecting auger.

13 Claims, 24 Drawing Figures

U.S. Patent  Apr. 22, 1980  Sheet 1 of 7  4,198,803
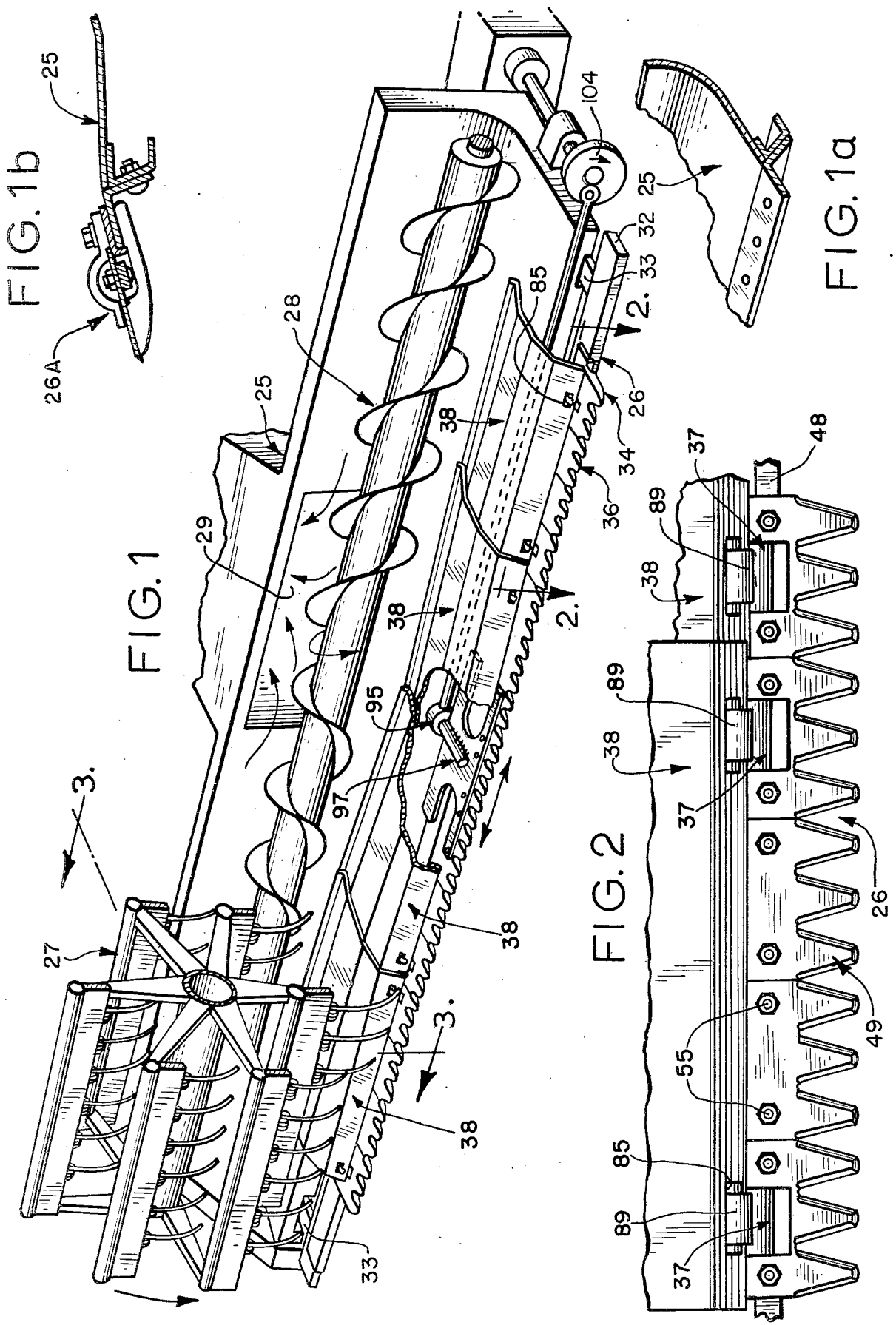

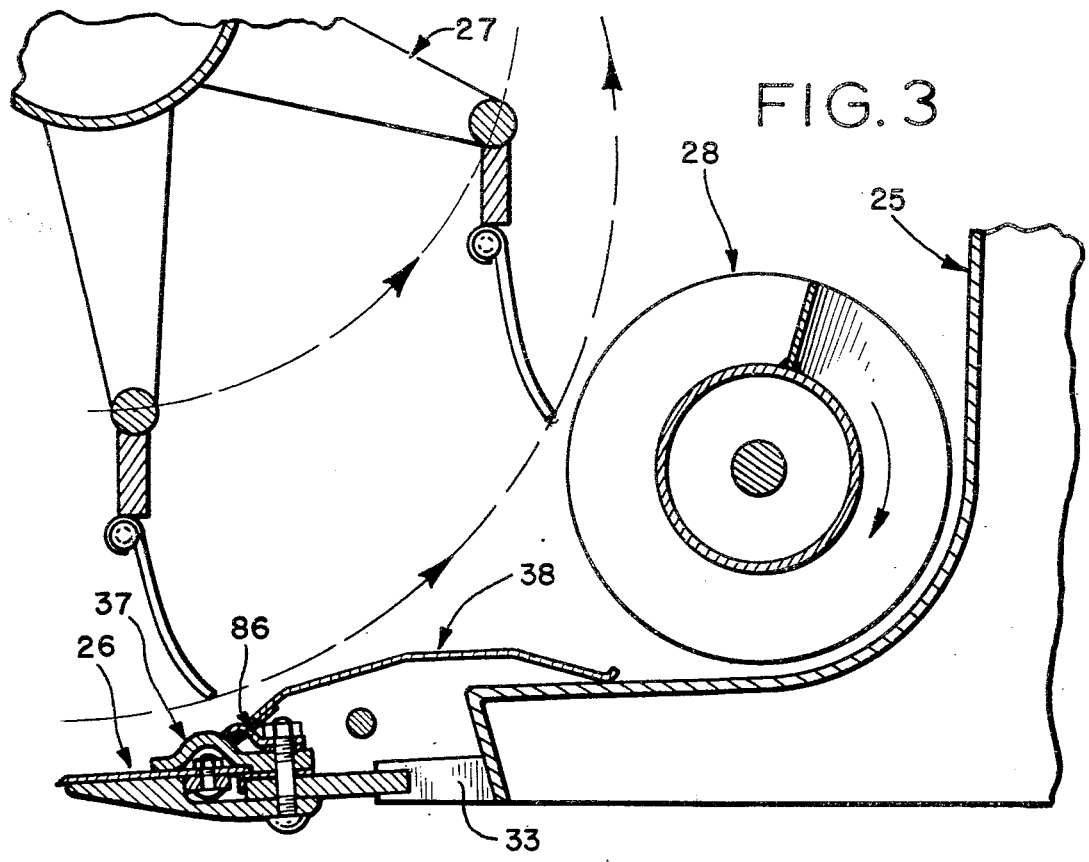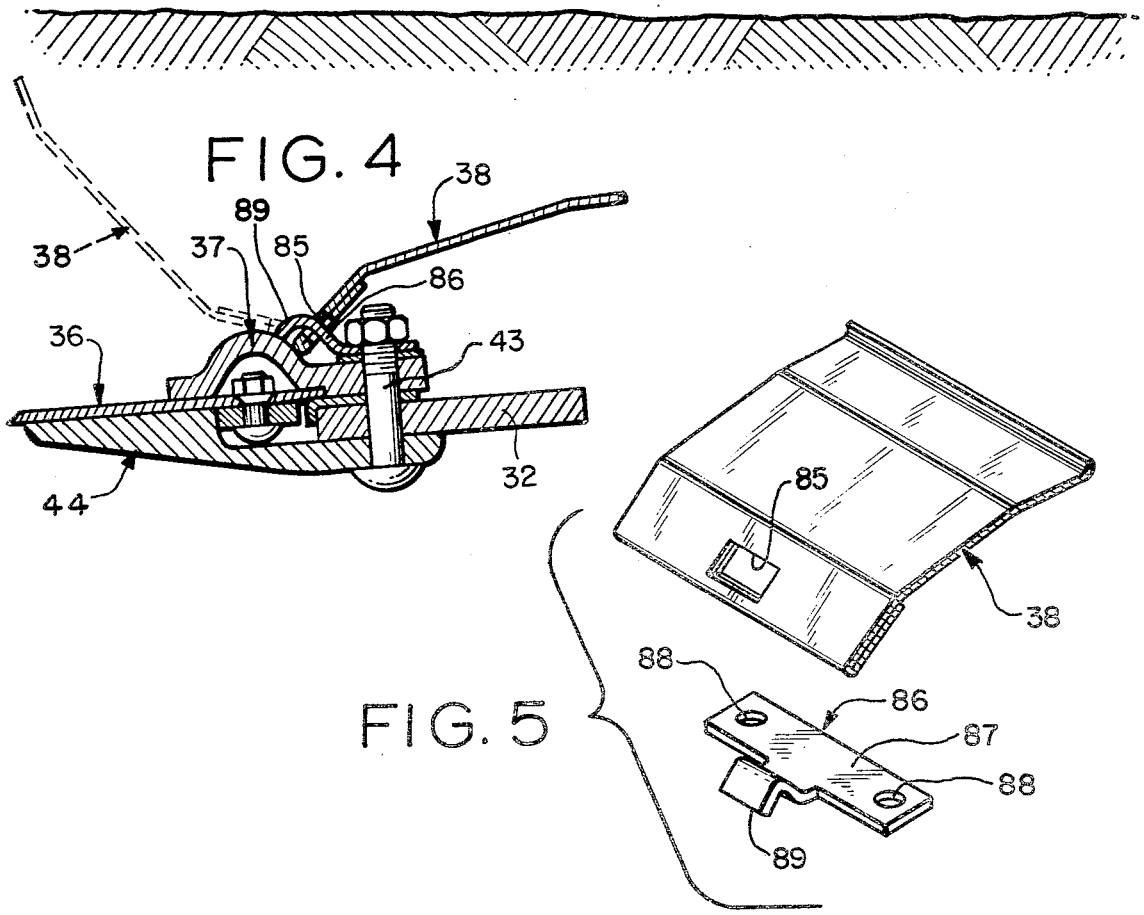

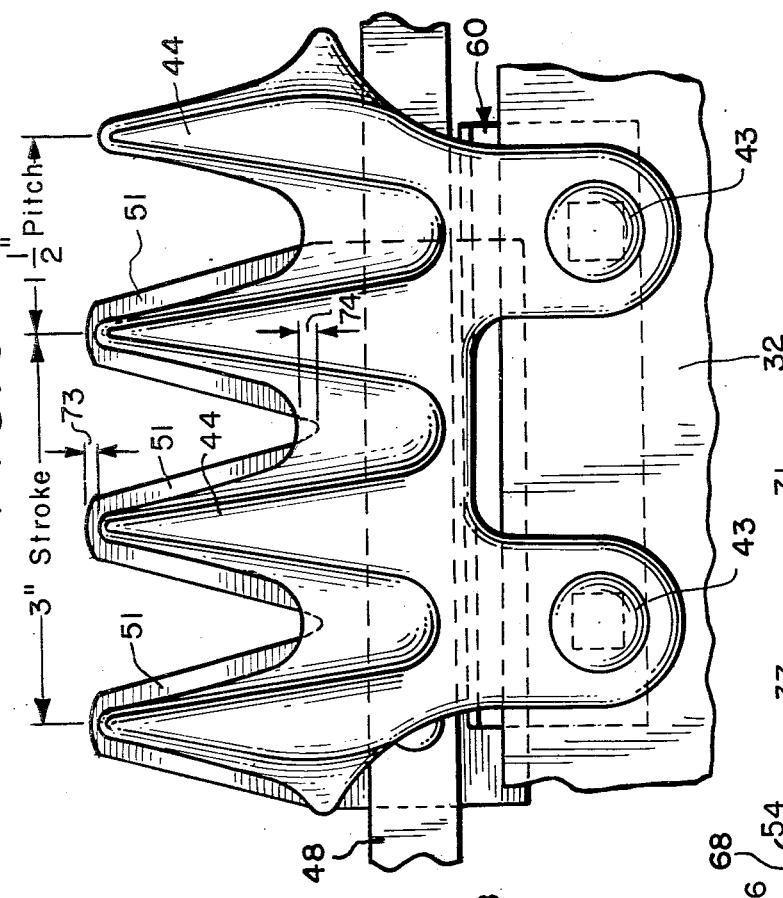
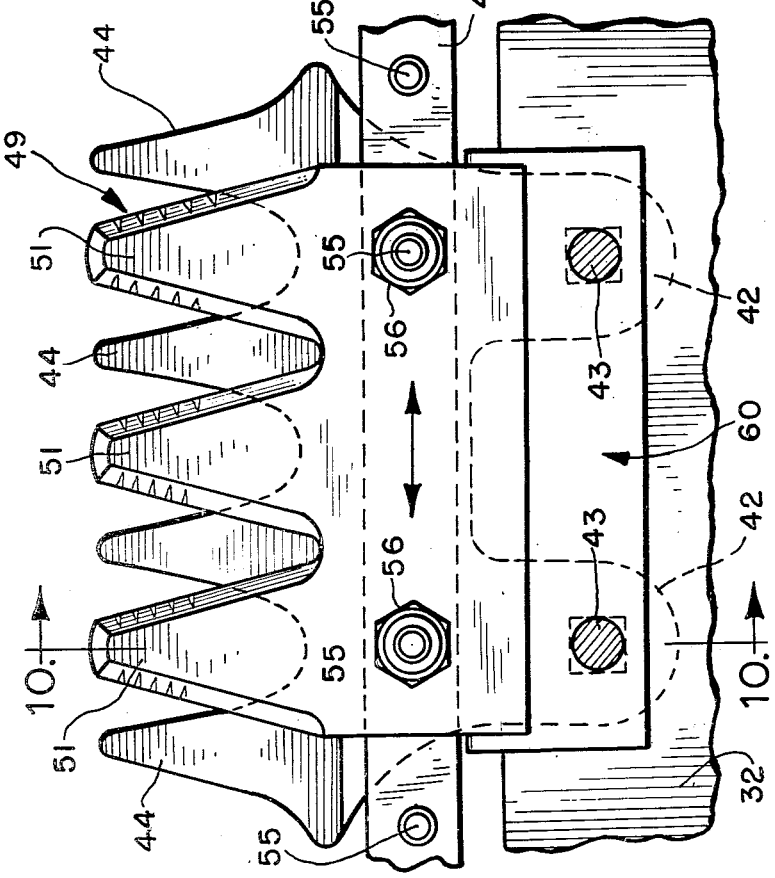
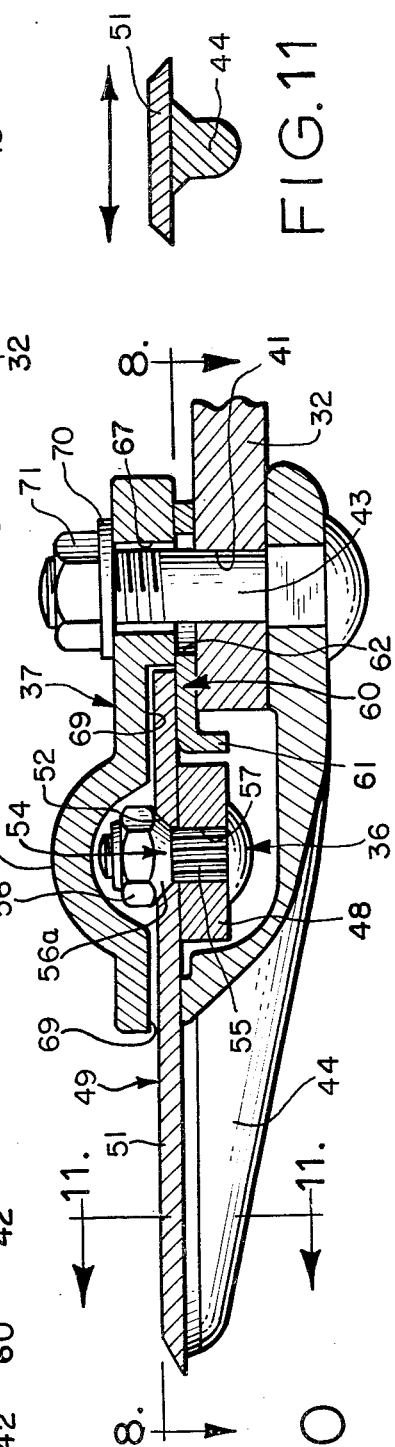

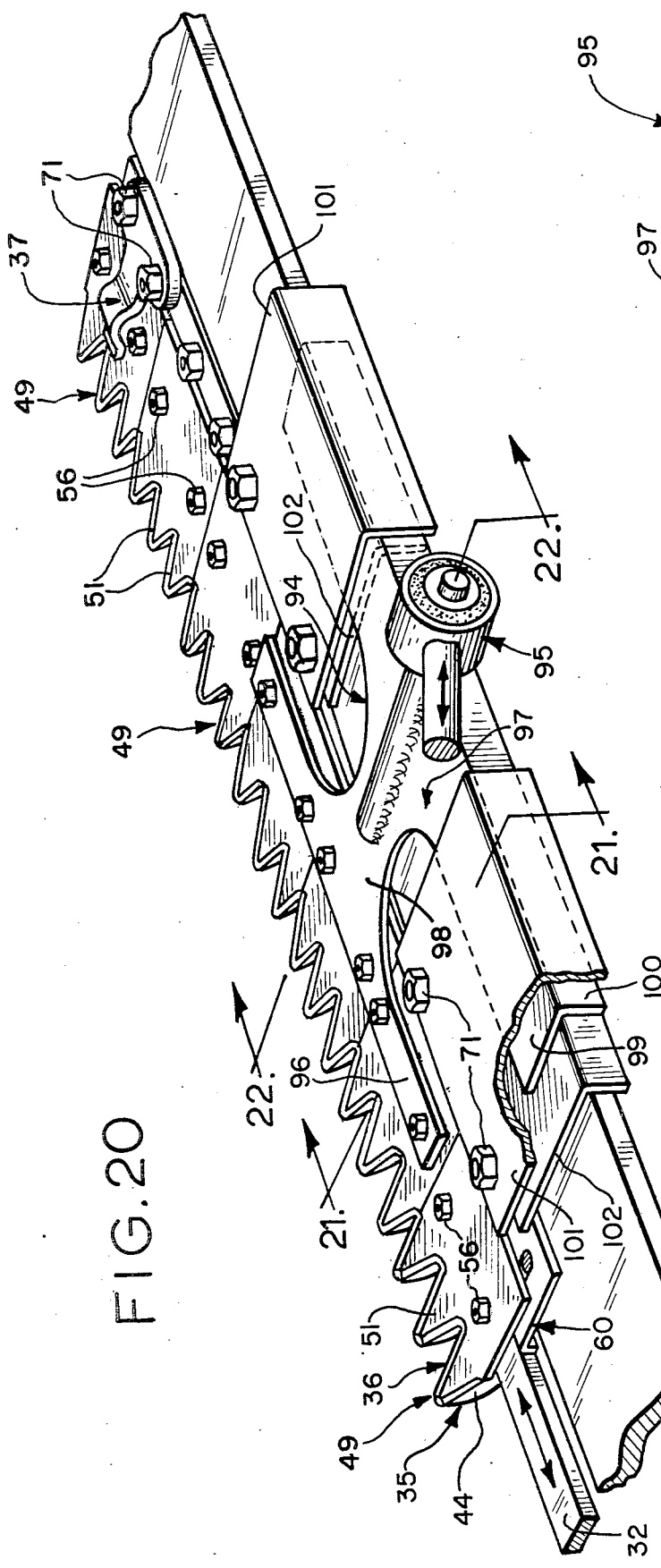
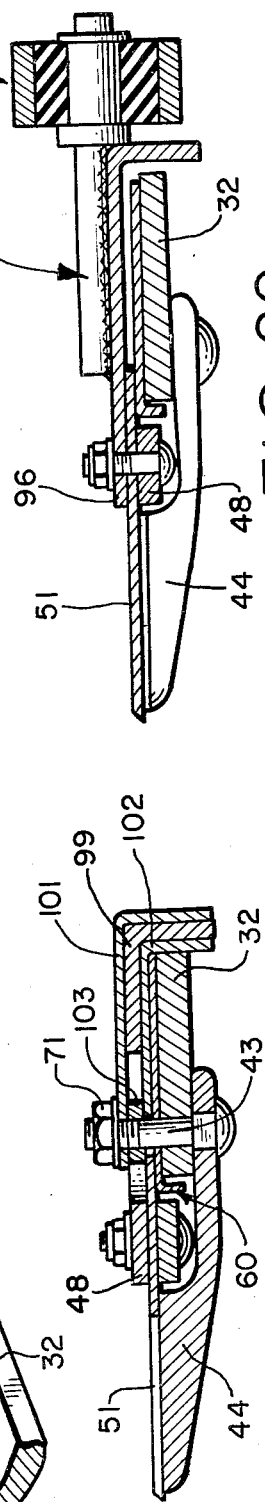

CUTTERBAR FOR A CROP HARVESTING MACHINE

This invention relates in general to a cutterbar for a crop harvesting machine, such as a combine, swather or mower, and more particularly to a flexible floating cutterbar capable of efficiently harvesting low-growing crops.

The cutterbar of the present invention includes a sectional guard structure having a plurality of guard sections and a sectional knife structure having a plurality of knife sections, wherein each guard section includes a plurality of prongs and each knife section includes a plurality of points. The pitch of the prongs and points is narrow and on the order of one-half the standard and universally established heretofore known pitch.

While the cutterbar of the invention can be used as a rigid unit, it is particularly useful as a floating flexible unit for cutting low-growing crops, such as soybeans, where it is essentially necessary to cut low over uneven ground and conform to the contour of the ground. When used in rigid fashion on a combine, it can efficiently harvest cereal crops, such as wheat, barley and oats. Further, the cutterbar can be used as a mower. However, it will be primarily described as a flexible cutterbar.

This general type of cutterbar is well known, as particularly illustrated in U.S. Pat. Nos. 3,098,338; 3,151,434; 3,682,021; 3,813,859; 3,844,095; 3,866,400; and 3,896,610.

Since it is projected that the soybean crop in the future will be substantially greater, it is important that the most efficient harvesting can be accomplished to provide the best possible yield. The well known floating cutterbar has been recognized to substantially reduce losses in soybean crop compared with the regular non-floating cutterbar. Still it has been recognized that harvesting of soybean crop is relatively inefficient in that combines leave behind about ten percent of the crop.

The cutterbar of the present invention in floating flexible form provides more efficient harvesting of a low-to-the ground or low-growing crop, such as soybeans, in that crop loss is substantially reduced, while at the same time harvest can be accomplished much faster. For example, the cutterbar of the present invention is capable of reducing crop loss levels to three percent and lower, while harvesting speed may be increased by as much as about 50 percent even though sickle or cutterbar speed is not increased. The cutterbar of the invention includes a narrow-pitch guard and knife or sickle bar where a knife point reciprocates through three guard prongs instead of through two guard prongs as heretofore done. The guard is defined by a plurality of juxtaposed multi-prong guard sections, while the knife or sickle bar includes a plurality of juxtaposed multi-point knife sections. Accordingly, crop stem movement is substantially decreased, while pod accelerations and shatter are lowered and stubbles are shorter. The narrow-pitch feature provides more cutting edges, thereby increasing the life of the knife sections. Relative arrangement between the knife sections and the guard sections reduces plugging and renders the cutterbar substantially self-cleaning. While the cutterbar of the present invention is illustrated as having single-shear action, it should also be recognized that it could be easily modified to have double-shear action if so desired.

A further feature of the invention is the structure of the knife sections wherein they are blanked from sheet metal. Thereafter, each blank has mounting holes punched in symmetrical locations and knife edges are produced by form-beveling the points and coining serrations simultaneously and thereafter grinding of the sections along a plane surface. Heretofore, edges have been made by grinding flat blanks to produce a beveled edge which requires gouging of the blank, thereby weakening certain portions and contributing to ultimate failure.

A further feature of the invention is the drive assembly for the sickle bar which includes a drive plate connected to the sickle bar and guided by wear plates that define substantial bearing surfaces whereby the drive assembly's life is greatly enhanced. Further the drive assembly is located to be positioned away from the ground behind the cutting action and in non-interfering relation with the crop flow where it can be protected by the feeder or feather shields.

The feeder or feather shields are a further feature of the invention in that they provide a smooth crop flow together with effective reel action. Further, the feather shields overlie and therefore protect the cutterbar hardware to eliminate the possibility of crop and/or dirt build-up on the cutterbar. The hinge structure for hinging the feather shields to the cutterbar is positioned forward to enable full access to the cutterbar and drive assembly for servicing, while providing a minimum of stress concentration at the flexure points in that a loose hinge structure not requiring close tolerances is provided.

It is therefore an object of the present invention to provide a new and improved cutterbar for crop harvesting machines capable of more efficient crop harvesting by lowering crop losses and permitting faster harvesting.

Another object of the present invention is to provide a new and improved flexible cutterbar for crop harvesting machines that is particularly useful for harvesting low-to-the-ground growing crops, such as soybeans or the like.

Still another object of this invention is in the provision of a flexible floating cutterbar capable of minimizing crop losses while speeding up harvesting, thereby generating more profit and efficiency.

A still further object of this invention is in the provision of a flexible cutterbar having multi-prong guard sections and multi-point knife sections on a narrow pitch so that each knife point reciprocates through three guard prongs, thereby reducing crop stem movement, crop pod accelerations and shatter, and producing shorter stubbles without increasing knife speed.

A still further object of this invention is in the provision of a flexible cutterbar for a crop harvesting combine which includes multi-prong guard sections and multi-point knife sections coacting such that the roots of the knife sections are behind the roots of the guard sections and the tips of the knife points are ahead of the tips of the guard prongs.

It is a further object of the present invention to provide an improved fastener assembly for fastening knife sections to a knife back to enable quick and easy field replacement.

A still further object of this invention is to provide a method of efficiently making knife sections that have long life.

Another object of this invention is in the provision of a drive assembly for a flexible cutterbar which effects driving of the sickle bar either at the end or intermediate between the ends thereof and which in the latter case essentially constitutes a mid-drive unit and which is constructed to have a long life.

Still another object of this invention is in the provision of a flexible cutterbar including coacting knife and guard assemblies and a feather shield assembly having a minimum of parts and producing smooth crop flow and effective reel action, and which includes a hinge structure capable of long life and enabling full access to the cutterbar and drive assembly.

Other objects, features and advantages of the invention will be apparent from the following detailed disclosure, taken in conjunction with the accompanying sheets of drawings, wherein like reference numerals refer to like parts, in which:

FIG. 1 is a fragmentary perspective view of the header of a crop harvesting combine having a flexible floating cutterbar according to the invention and with some parts broken away in order to show underlying parts for clarity;

FIG. 1A is a fragmentary perspective view of a combine header on which a rigid cutterbar is to be mounted;

FIG. 1B is a side elevational view of a rigid cutterbar mounted on the header shown in FIG. 1A according to the invention;

FIG. 2 is a greatly enlarged fragmentary top plan view of the cutterbar and taken substantially along line 2—2 of FIG. 1;

FIG. 3 is a greatly enlarged and fragmentary sectional view taken substantially along line 3—3 of FIG. 1;

FIG. 4 is an enlarged transverse sectional view of the cutterbar and illustrating the manner in which the feather shields are hingedly connected to the cutterbar;

FIG. 5 is an exploded view of a portion of a feeder shield and a clip for holding the feeder shield in place on the cutterbar;

FIG. 8 is a somewhat top plan view of a section of the cutterbar and taken generally along line 8—8 of FIG. 10;

FIG. 9 is a bottom plan view of a portion of the cutterbar according to the invention;

FIG. 10 is a greatly enlarged sectional view taken through the cutterbar of the invention and taken particularly along line 10—10 of FIG. 8;

FIG. 11 is a detailed sectional view of a knife point and guard prong and taken substantially along line 11—11 of FIG. 10;

FIG. 20 is a perspective view, with some parts broken away for purposes of clarity, of a drive assembly according to the present invention for a floating cutterbar unit;

FIG. 21 is a transverse sectional view taken substantially along line 21—21 of FIG. 20; and FIG. 22 is a transverse sectional view taken substantially along line 22—22 of FIG. 20.

Figure 6:
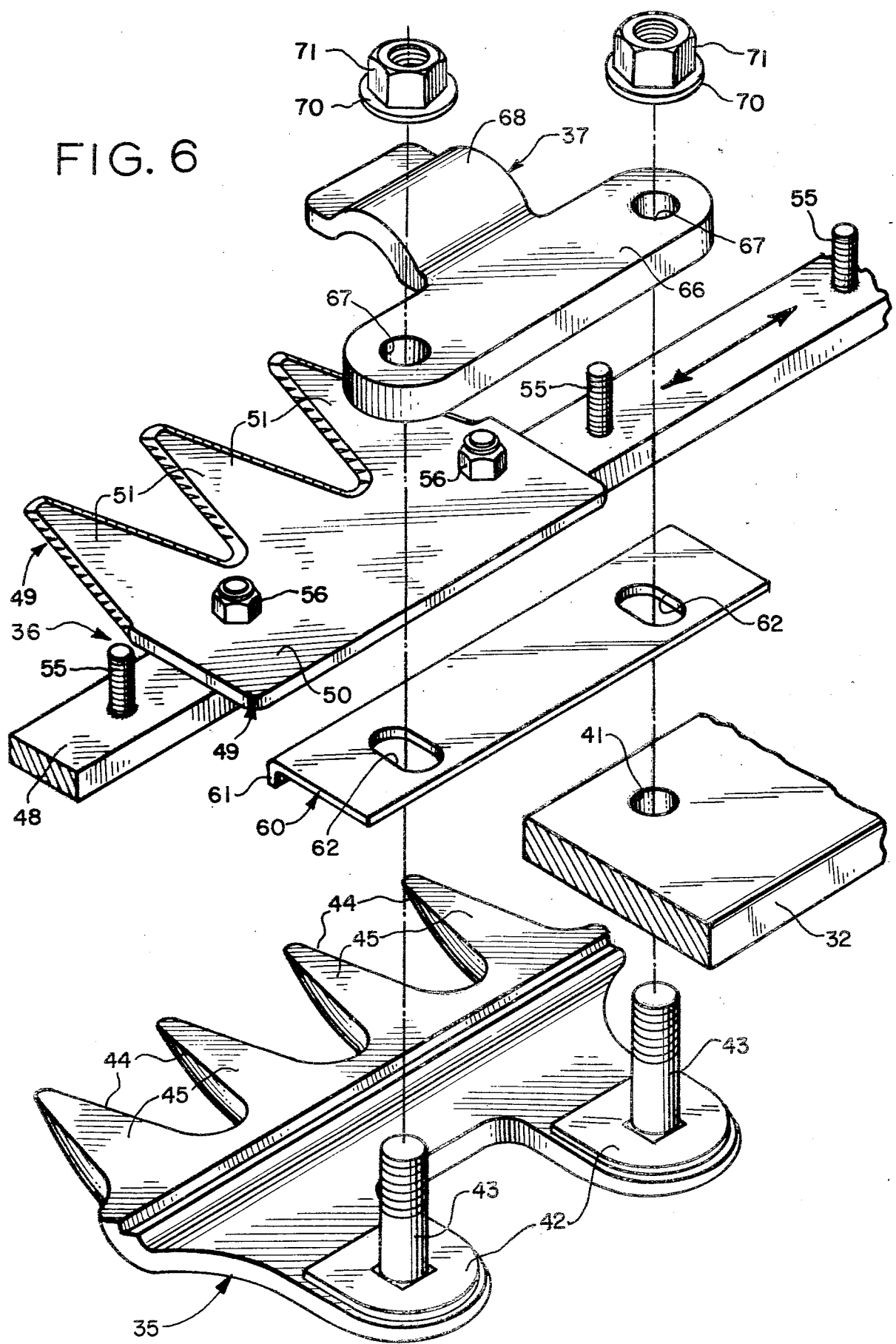
FIG. 6 is a greatly enlarged exploded perspective view of the cutterbar according to the invention.
Figure 7:
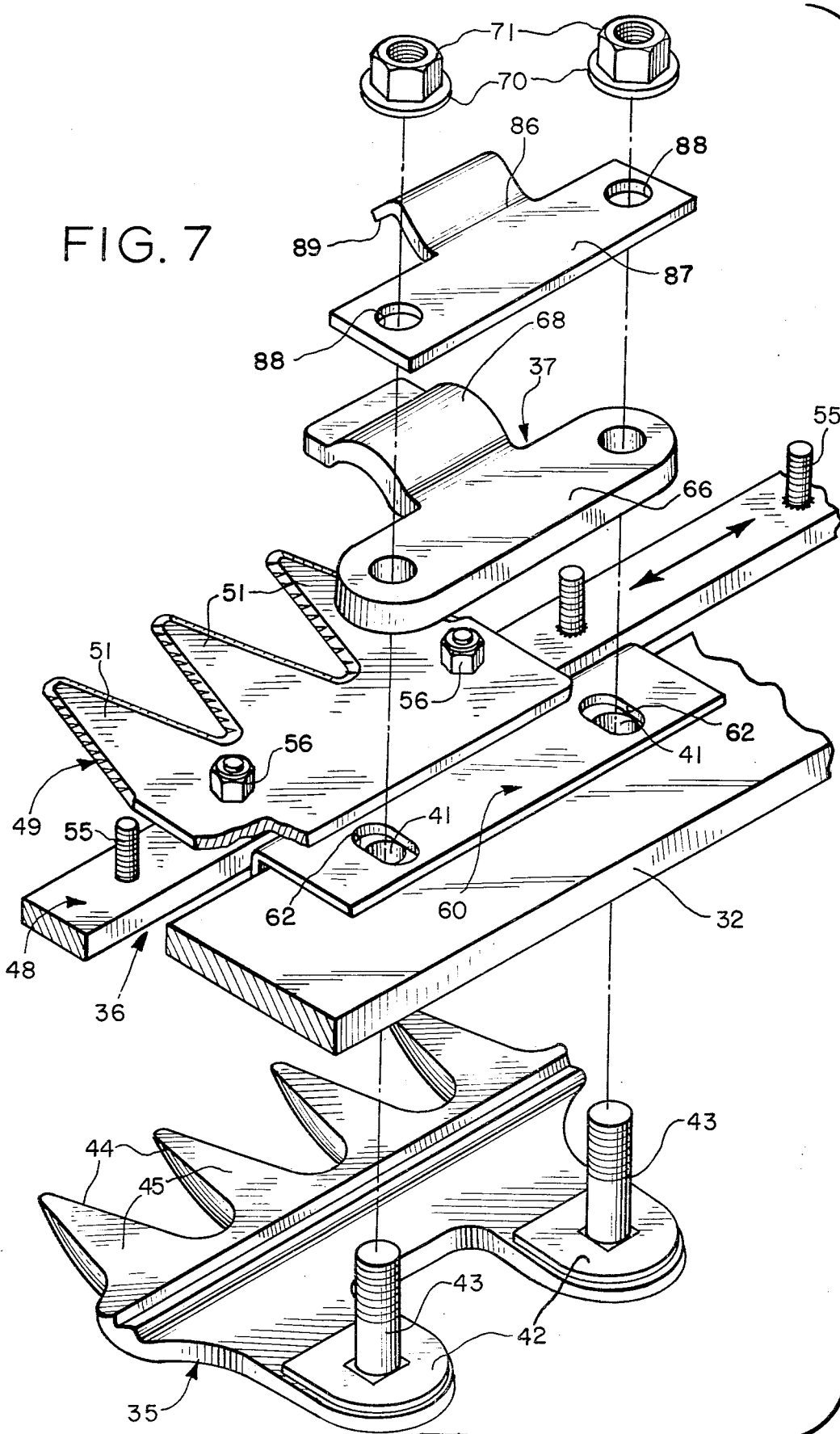
FIG. 7 is a perspective exploded view of the cutterbar according to the invention similar to FIG. 6 but showing some parts in assembled relation to illustrate the relationship between the working parts of the cutterbar.

Referring now to the drawings, and particularly to FIG. 1, a header for a crop harvesting combine is shown and generally indicated by the numeral 25, and which supports a cutterbar 26 according to the invention. The crop is severed at the stem by the cutterbar 26 and a reel 27 assists movement of the cut grain to a collecting auger 28 which delivers the crop to a chute 29 and into the combine for further processing. It will be understood that the present invention only concerns the cutterbar 26 whether used in rigid form as shown in FIGS. 1A and 1B or in flexible form as shown in FIG. 1, together with associated parts. When the cutterbar is used as a flexible floating unit, it can flex as it travels over uneven ground to conform to the contour of the ground and cut the crop at a point along the crop stem very close to the ground. The flexible cutterbar 26 according to the invention is especially useful for cutting low-growing crops such as soybeans, while the rigid cutterbar 26A of the invention is especially useful for cutting cereal crops, such as wheat, barley and oats. When the cutterbar is used in flexible form, it is supported by a plurality of arms that are spring mounted to the header, while the rigid form of cutterbar shown in FIGS. 1A and 1B is bolted directly onto an angle bar secured to the header.

The cutterbar 26, as seen particularly in FIGS. 1, 2, 3, 4, 6 and 7, includes generally a bar back 32 which is in the form of an elongated continuous bar extending across the width of the header and connected to and supported by the header through a plurality of arms 33. The support given to the cutterbar by the arms 33 allows the cutterbar to float along and conform to the contour of the ground and thereby float relative to the header 25. However, it can be appreciated that the cutterbar may be locked in position and thereby function as a rigid cutterbar or may equally well be mounted in the place of any regular cutterbar.

A guard 34 in the form of a plurality of juxtaposed guard sections 35 is fastened to the bar back 32, while a sickle bar or knife bar 36 is reciprocably supported on the bar back and guard. A plurality of holddown clips 37, which may be rigid or of spring-loaded design, are arranged in spaced relation along the cutterbar to hold the sickle bar 36 in place and prevent it from moving upwardly relative to the guard. A plurality of feeder or feather shields 38 are also supported on the cutterbar and coact therewith to provide crop flow toward the collecting auger 28. Further, the feather shields 38 serve to protect the mounting hardware of the cutterbar. It can be appreciated that hinging of the feather shields on the cutterbar allows upward and downward movement of the shields as the cutterbar moves upward or downward to the header, and allows access to the cutterbar hardware when swung upwardly.

Referring now more particularly to the cutterbar structure as shown in FIGS. 6 to 10, it will be appreciated that the bar back 32 is in the form of a continuous steel bar extending across the header with bolt holes 41 arranged on standard three-inch centers. Essentially, the bar back 32 constitutes the base of the cutterbar, for it supports the guards and the sickle bar 36.

The guard 34, as already mentioned, is defined by a plurality of juxtaposed guard sections 35. Each guard section is preferably in the form of a forged part having bolt holes for receiving bolts. The forged part includes bolt-supporting pads 42 having holes for receiving bolts 43. Forwardly of the bolt-supporting pads 42 and on a higher level are a plurality of prongs 44. The prongs in the embodiment illustrated are spaced apart on a one-and-one-half inch pitch, while it is appreciated the holes for bolts 43 are spaced apart on a standard three-inch pitch. Heretofore, it has been universally accepted to space prongs on a three-inch pitch.

As seen particularly in FIG. 10, the lower side of the guard sections is contoured with an upwardly sloping portion toward the tip ends of the prongs 44, while the lower sides of the prongs are generally arcuately formed in cross section in the usual manner. The upper surfaces 45 of the prongs against which the sickle bar slides are planar.

As above noted, it has been conventional to provide a three-inch pitch for guard prongs and for mounting bolts for guards. Indeed, the three-inch pitch has been a universal standard. However, the cutterbar of the present invention utilizes preferably a one-and-one-half inch pitch for guard prongs although it can be appreciated it could possibly utilize a still smaller pitch. It should be further recognized that the holes for the mounting bolts of the guard sections 35 continue to use the three-inch spacing which is a standard in the industry and the bolt holes formed in the guard sections are symmetrically located on the sections relative to the guard prongs such that they are aligned with junctions between adjacent prongs.

The sickle bar 36 includes a knife back 48 in a continuous form and onto which are secured a plurality of juxtaposed knife sections 49. Each knife section includes a base portion 50 having a plurality of section points or knife points 51 extending therefrom on a pitch equal to the pitch of the guard prongs. Accordingly, where the pitch of the guard prongs is one and one-half inches, the pitch of the knife points would also be one and one-half inches. The base portion 50 of each knife section includes mounting holes 52 spaced on three-inch centers and in alignment with the outside knife points of the section.

One of the features of the invention is to provide a fastener assembly 54 for fastening the knife sections to the knife back so that the knife sections may easily be removed or replaced in the event of a damaged section.

The fastener assembly 54 includes a bolt 55 and a nut 56. The shank of the bolt 55 is formed with longitudinal ridges or serrations and sized so that the bolts must be driven into bolt holes 57 on the knife back. Accordingly, once the bolt is in place, it will not rotate relative the knife back and it will essentially be captive with the knife back. However, it can be driven out in the event a new bolt needs to be installed. The nut 56 includes a conical portion 56a which mates with a conical portion of the hole 52 in the knife section to assist in properly locating the knife section on the knife back. Accordingly, it can be appreciated that with a simple wrench a knife section may be removed in the field and replaced in the event of a damaged section, and it is only necessary to remove the nuts holding the section in place, while the bolts stay in place and do not rotate relative the knife back.

It will be appreciated that the knife section points project forwardly of the knife back 48, while a portion of the base portion of each knife section projects rearwardly as best seen in FIG. 10. The knife points bear against the planar surfaces 45 of the guard prongs and therefore coact with the guard prongs to define a cutting action when the sickle bar is reciprocally driven relative the guard sections. The rearmost area of the base portion 50 is supported on a wear plate or bearing plate 60 that in turn is supported on the bar back 32. The wear plate 60 is not continuous along the bar back 32 and therefore is sectional with sections positioned approximately every foot along the bar back. Accordingly, the sickle bar 36 is supported along its rear end by a plurality of wear plates arranged along the bar back. In particular, the undersurfaces of the knife section base portions bear against the upper surfaces of the wear plate sections, as seen particularly in FIG. 10. The forward edge of each wear plate section has a downwardly extending lip 61 that defines an essentially vertical face against which the backside of the knife back generally engages during its reciprocal movement. Each wear plate section 60 includes slotted fastening holes 62 through which the guard bolts 43 extend. It may be appreciated that the positions of the wear plates may be adjusted within the limits of the slotted holes 62 to properly guide and position the sickle bar relative the guard sections.

Holddown clips 37 are provided for locking the wear plates in position and for holding the sickle bar in position against the guard sections. Each holddown clip 37 is generally T-shaped and includes a cross arm 66 having bolt holes 67 through which the bolts 43 of the guards extend and a leg 68 which is arcuately formed to allow unimpeded movement of the fasteners 54 of the sickle bar, while at the same time defining downwardly facing bearing surfaces 69 for maintaining the sickle bar in position on the guard sections. Washers 70 and nuts 71 coacting with bolts 43 complete the fastener assembly for locking the guard sections, wear plates and sickle bar together in relation to the bar back 32. Holddown clips 37 are mounted about one foot apart along the cutterbar and in general alignment with the wear plates 60.

As viewed particularly in FIGS. 8 to 10, it can be seen that the sickle bar is positioned relative the guard such that the tip ends of the knife points 51 extend forwardly of the tip ends of the guard prongs 44 a distance 73 (FIG. 9), while the roots of the knife points extend rearwardly of the roots of the guard prongs a distance 74. By virtue of the knife points extending ahead of the guard prongs a "live knife" principle is defined by the oscillatory movement of the knife for the purpose of eliminating the hang-up of trash onto the tips of the guard sections. This principle is generally shown in U.S. Pat. Nos. 3,098,338 and 3,151,434. Further, the location of the roots of the guard prongs being ahead of the roots of the knife points facilitates more efficient cutting of crop and prevents the plugging of the cutterbar as the entire edge along each guard prong is continually being subjected to movement thereover of a cutting edge of a knife section.

Figure 14:
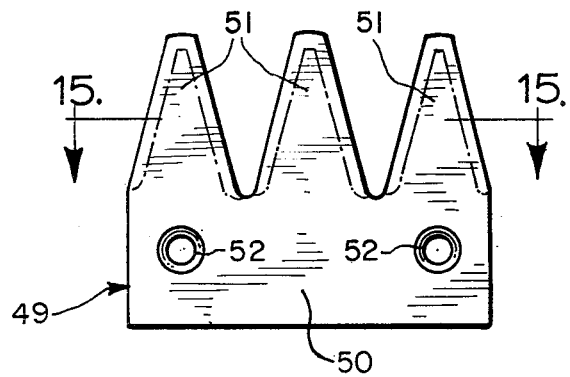
FIG. 14 is a top plan view of a knife section blank to illustrate the first step in forming a knife section according to the invention.
Figure 15:
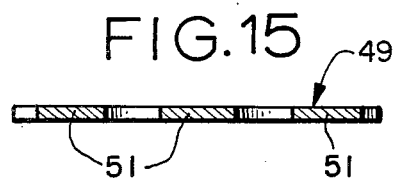
FIG. 15 is a sectional view taken substantially along line 15—15 of FIG. 14.
Figure 18:
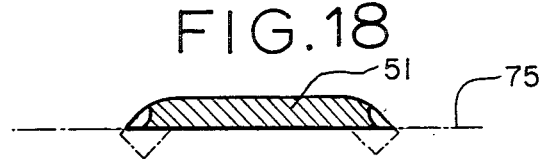
FIG. 18 is a sectional view of a point such as that shown in FIG. 17 and illustrating the grinding function which shows grinding along a plane surface of the section.
Figure 16:
FIG. 16 is a view similar to that taken along line 15—15 of FIG. 14 but showing the edges of the points form-beveled and coined with serrations.
Figure 19:
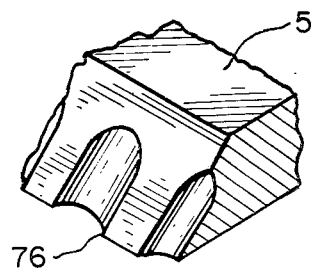
FIG. 19 is a greatly enlarged fragmentary view of a portion of the knife section illustrating the final edge formation.
Figure 17:
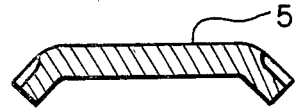
FIG. 17 is an enlarged sectional view of one of the points which has been form-beveled and serration coined.

Each knife section 49 is specially formed so as to allow it to be economically constructed and to provide the maximum life. The section is first cut into a blank of the shape shown in FIG. 14. Following the blanking the holes 52 are punched in the base portion 50. The edges of the knife points 51 are then simultaneously beveled and serrated by coining to the configuration shown in FIGS. 16 and 17. Thereafter, the bottom plane surface is ground along the line 75, as shown in FIG. 18, to ultimately define the form-beveled and serrated cutting edge 76 shown particularly in FIG. 19. The blank will take the form shown in FIGS. 16 and 17 following the form-beveling and coin-serrating which allows the metal to flow into the cutting edges to avoid wear. Following the grinding along the plane surfaces or the underside of the knife section, the entire section is heat treated to complete the structure. It may be further finished by chrome plating where necessary to withstand abrasive or corrosive environments.

Figure 12:
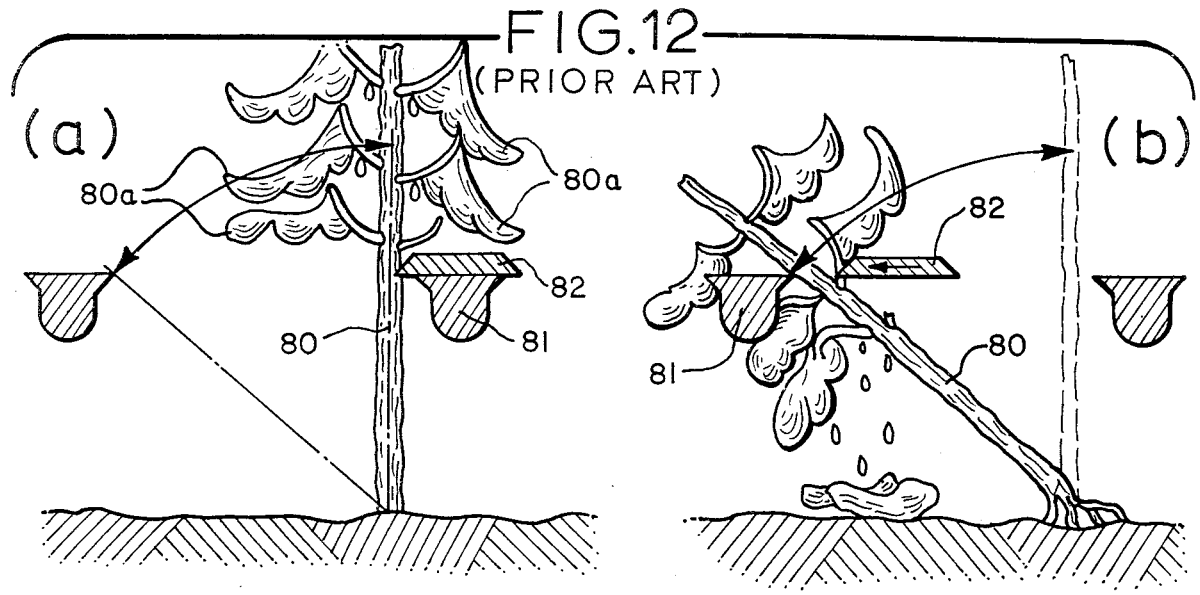
FIGS. 12a and 12b illustrate the cutting action of heretofore known cutterbars when cutting a low-to-the-ground crop.
Figure 13:
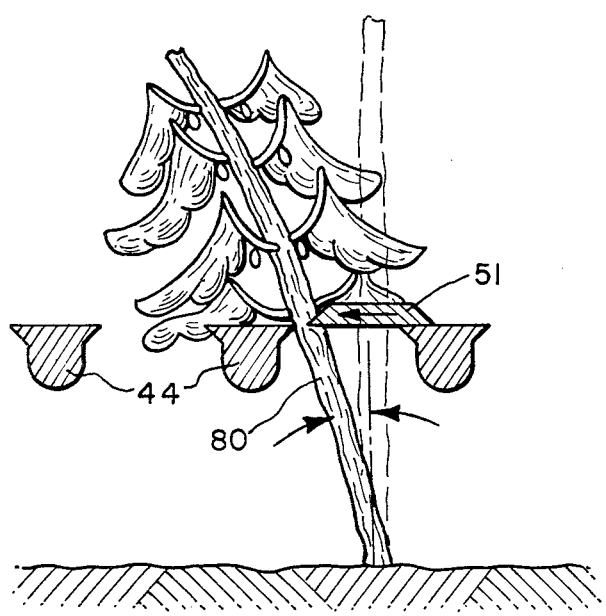
FIG. 13 illustrates the cutting action of the cutterbar according to the present invention and illustrating the reduction of crop loss.

The narrow-pitch cutterbar of the invention effects minimum plant displacement during cutting, thereby reducing pod accelerations and shatter. As particularly illustrated in FIGS. 12 and 13, the prior art shown in FIG. 12 causes greater plant displacement during cutting operation than the cutterbar of the present invention. Inasmuch as the pitch of the guard prongs and knife blade sections heretofore known has been a universally accepted three inches, and since the pitch in the cutterbar of the present invention is at least half the pitch of prior art units, it can be appreciated that the movement of the crop stem is halved. As seen in FIG. 12a, a crop stem is shown in erect undisturbed position by the numeral 80. The guard prongs illustrated in FIG. 12 are designated 81, while the knife points are designated 82. As is illustrated in FIG. 12b, movement of the knife point 82 in the direction shown by the arrow thereon toward the guard prong 81 causes bending of the crop stem 80 such as to cause substantial displacement of the crop stem from its normal vertical position to shake off some of the pods 80a resulting in crop loss and also to even cause some of the pods 80a to end up below the cutting action of the cutterbar, again reducing crop yield. By virtue of the narrow pitch in the cutterbar of the present invention, as seen in FIG. 13, the crop stem is moved substantially less to allow severing of the stem below the location of the pods 80a and thereby considerably improve crop yield. Further, by reducing the displacement or bending of the crop stems, shatter or loss of pods from a stem is reduced. Further, the stubbles or remaining portions of the crop stem are shorter with the cutting action of the present invention shown in FIG. 13. Accordingly, it can be readily appreciated the advantage of the cutterbar of the present invention over the prior art in obtaining higher crop yield.

The feather shields 38 are hingedly connected to the cutterbar at their leading edges by means of slotted openings 85 coacting with holddown clips 86. The holddown clips 86 are secured to the guard bolts 43, as seen particularly in FIGS. 3 and 4. Further, it can be seen in FIG. 5 that the holddown clips 86 are T-shaped in a similar fashion to the holddown clips 37 and include a crossbar portion 87 having a pair of bolt holes 88 and a leg portion 89 having a forwardly facing curved portion that freely fits in a slotted opening 85 of the shield. The loose fit between the slotted openings 85 of the feather shields and the clips permits easy movement of the feather shields relative the cutterbar and provides a minimum of stress concentration at the forward edges of the feather shields, especially when the cutterbar flexes along its length to conform to ground contour. The shields are formed to define efficient crop flow characteristics and the forward edges are sufficiently close to the cutterbar to eliminate any ledge effect that would allow crop accumulation. As seen particularly in FIGS. 1 and 2, a plurality of feather shields are provided across the cutterbar with adjacent edges in overlapping relationship. If the cutterbar were rigid, it could be appreciated that a single shield could be provided across the entire cutterbar width. Servicing of the cutterbar can easily be accomplished by pivoting forwardly of the feather shields about 150 degrees to give access to the cutterbar structure. The trailing edges of the feather shields rest on the header and accordingly move up and down as the cutterbar when in floating relationship with the header moves up and down relative thereto.

Where the cutterbar according to the invention is of the flexible floating type, a drive assembly, as shown particularly in FIGS. 20 to 22, may be employed. This drive assembly is connected to the sickle bar between the ends thereof and includes a drive plate 94 connected to the sickle bar and to a pitman 95 and suitably supported by means of wear or bearing plates mounted on the bar back 32. The drive plate 94 includes a connecting arm 96 in engagement with and being secured to the sickle bar 36 and a rearwardly arranged support portion 97 connected to the connecting arm 96 by a web portion 98. The support portion 97 includes a horizontally arranged portion 99 and a vertically arranged portion 100 extending at a right angle to the portion 99. The support portion is bearingly guided between two sets of spaced apart upper and lower wear or bearing plates 101 and 102. The wear or bearing plates similarly include horizontal portions and vertical portions and define a channel therebetween for receiving the support portion 97 of the drive plate. The wear plates are secured to the bar back 32 by the guard bolt assemblies which include the guard bolts 43 and nuts 71. Spacers 103 are provided along the bolts 43 to effect the proper spacing between the upper and lower wear plates 101 and 102. As seen in FIG. 1, the pitman 95 connects to a drive crank 104 which applies the reciprocating motion to the drive plate and therefore to the sickle bar. As seen particularly in FIG. 1, the drive assembly is completely shielded from dirt and crop by the feather shields. The rather extensive bearing surface for the drive plate permits greater dissipation of heat caused by reciprocation of the drive plate and therefore enhances the life of the drive assembly. Accordingly, it can be appreciated that the drive assembly is unique for a flexible cutterbar and will permit more overall efficient operation of the cutterbar.

It will be understood that modifications and variations may be effected without departing from the scope of the novel concepts of the present invention, but it is understood that this application is to be limited only by the scope of the appended claims.

The invention is hereby claimed as follows:

1. In a crop harvesting machine having a cutterbar, including a bar back, guard means secured to said bar back having a plurality of juxtaposed multi-prong guard sections, and a knife assembly coacting with said guard means and having a knife back and a plurality of multi-point juxtaposed knife sections secured to said knife back, the improvement in the guard means and knife assembly wherein each guard section is secured to the bar back with bolts symmetrically located in alignment with junctions between adjacent prongs, each knife section having the points thereof spaced apart the same distance as the prongs of the guards on a narrow pitch such that movement of crop stems harvested is minimized, said knife sections being positioned and reciprocally mounted with respect to the guard sections such that the tips of the knife points extend ahead of the tips of the guard prongs in the direction of cutterbar movement and the roots of the knife sections extend behind the roots of the guard sections.

2. The improvement as defined in claim 1, wherein said guard prongs and knife points have a one-and-one-half inch pitch.

3. The improvement as defined in claim 2, wherein said cutterbar further includes means for driving said knife assembly through a stroke at least twice the pitch of the guard prongs and knife points so that each knife point moves over at least three guard prongs.

4. The improvement as defined in claim 1, which further includes means for driving said knife assembly through a stroke equal to at least twice the pitch of the guard prongs and knife points.

5. The improvement as defined in claim 1, wherein each guard section includes four prongs with bolt mounting means symmetrically located in alignment with junctions between adjacent prongs.

6. The improvement as defined in claim 1, wherein means fastening each knife section to the knife back includes a plurality of fastening assemblies each having a bolt mounted on the knife back and captive therewith and a nut coacting with the bolt and knife section, whereby replacement of a knife section only necessitates removal of the nuts.

7. In a crop harvesting machine having a flexible cutterbar supported for travel over uneven ground and conforming to the contour thereof, wherein said cutterbar includes a bar back, guard means secured to the bar back having a plurality of the juxtaposed multi-prong guard sections, and a knife assembly coacting with said guard means and having a knife back and a plurality of juxtaposed knife sections secured to the knife back, the improvement in a drive assembly for reciprocating said knife assembly, said drive assembly including a drive plate secured to the knife assembly between the ends thereof, support and guide means mounted on said bar back on opposite sides of said drive plate and slidably guiding said drive plate for reciprocal movement therebetween, and pitman means connected to said drive plate.

8. The improvement as defined in claim 7, wherein said support and guide means includes coacting upper and lower wear plates.

9. The improvement as defined in claim 7, wherein said wear plates define right angle shaped guideways, and said drive plate includes a right angle shaped portion received by the guideways.

10. The improvement as defined in claim 9, wherein said coacting wear plates includes two pair of wear plates spaced apart on said bar back.

11. In a crop harvesting machine having a flexible cutterbar supported for travel over uneven ground and conforming to the contour thereof, wherein said cutterbar includes a bar back, guard means secured to the bar back having a plurality of juxtaposed multi-prong guard sections, and a knife assembly coacting with said guard means and having a knife back and a plurality of juxtaposed knife sections secured to the knife back, the improvement in a feeder shield assembly comprising a plurality of shields along the cutterbar in edge overlapping relation, hinge means at the front edges of the shields hingedly connecting the shields to the cutterbar, said hinge means including rectangular slots along the leading edges of the shields and forwardly facing clips secured to the cutterbar, wherein said clips and slots coact to define a loose hinge connection and place the leading edges of the shields ahead of mounting hardware for the cutterbar and at the base of the knife sections.

12. A cutterbar for a crop harvesting machine or the like comprising, a bar back, guard means in the form of a plurality of juxtaposed guard sections having an even number of prongs, symmetrically located fastener mounting holes in the guard sections in alignment with the junctions between adjacent prongs, fastener mounting holes in the bar back, fasteners coacting with the holes in the guard sections and the bar back for securing the guard sections to the bar back, a sickle bar reciprocably supported by the bar back and guard means and including a knife back and a plurality of multi-point juxtaposed knife sections secured to said knife back, the knife points coacting with the guard prongs for cutting crop, and each knife section having the points thereof spaced apart the same distance as the prongs of the guards on a narrow pitch such that movement of crop stems harvested is minimized, said knife sections being positioned and reciprocally mounted with respect to the guard sections such that the tips of the knife points extend ahead of the tips of the guard prongs in the direction of cutterbar movement and the roots of the knife sections extend behind the roots of the guard sections.

13. A cutterbar as defined in claim 12, wherein the holes in the bar back and the guard sections are equally spaced apart and adjacent holes in abutting guards are spaced apart a distance equal to the spacing of the bar back holes.

* * * * *